United States Patent
You (10) Patent No.: US 9,432,512 B2
(45) Date of Patent: Aug. 30, 2016

(54) CLOUD AGENT REALIZING METHOD AND SYSTEM, AND CLOUD AGENT SERVER

(75) Inventor: Bo You, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 188 days.

(21) Appl. No.: 14/361,431

(22) PCT Filed: Mar. 1, 2012

(86) PCT No.: PCT/CN2012/071829
§ 371 (c)(1),
(2), (4) Date: May 29, 2014

(87) PCT Pub. No.: WO2013/082889
PCT Pub. Date: Jun. 13, 2013

(65) Prior Publication Data
US 2014/0341367 A1  Nov. 20, 2014

(30) Foreign Application Priority Data
Dec. 6, 2011  (CN) .......................... 2011 1 0400952

(51) Int. Cl.
H04M 3/00 (2006.01)
H04M 3/51 (2006.01)
H04L 29/08 (2006.01)

(52) U.S. Cl.
CPC ......... H04M 3/5183 (2013.01); H04L 67/1031 (2013.01); H04L 67/1097 (2013.01); H04M 3/5125 (2013.01); H04M 2203/6018 (2013.01); H04M 2207/45 (2013.01)

(58) Field of Classification Search
CPC ............ H04M 3/5191; H04M 3/5183; H04M 3/5175; H04M 3/5166; H04L 45/00; H04L 67/04; H04L 12/4641; H04L 67/141; H04L 65/1069; H04L 67/10

USPC .......... 379/265.04, 265.09, 265.02; 709/223, 709/227–229, 249

See application file for complete search history.

(56) References Cited

U.S. PATENT DOCUMENTS 6,983,045 B2  1/2006  Parker
2003/0065801 A1  4/2003  Eitel et al.
(Continued)

FOREIGN PATENT DOCUMENTS

CN  101079735 A  11/2007
CN  101815135 A  8/2010
(Continued)

OTHER PUBLICATIONS

Supplementary European Search Report in European application No. 12855484.7, mailed on Oct. 7, 2014.
(Continued)

*Primary Examiner* — Rasha Al Aubaidi
(74) *Attorney, Agent, or Firm* — Oppedahl Patent Law Firm LLC (57) ABSTRACT

Disclosed is a cloud agent realizing method, including that: an agent is communicatively connected to a cloud agent server, acquires a parameter of the agent and a parameter of the cloud agent server from the cloud agent server, and logs in to the cloud agent server according to the acquired parameters. Also disclosed are a cloud agent realizing system and a cloud agent server. With the disclosure, cloud agent registration and management are realized in a Next Generation Call Center Cloud NGC3.

17 Claims, 4 Drawing Sheets

(56) References Cited

U.S. PATENT DOCUMENTS

| | | | |
|---|---|---|---|
| 2005/0129213 A1 | 6/2005 | Parker | |
| 2010/0169497 A1* | 7/2010 | Klimentiev | G06F 9/546 709/228 |
| 2013/0003537 A1 | 1/2013 | Khasnabish | |

FOREIGN PATENT DOCUMENTS

| | | |
|---|---|---|
| CN | 102158612 A | 8/2011 |
| EP | 1298902 A1 | 4/2003 |
| WO | 2011100744 A2 | 8/2011 |

OTHER PUBLICATIONS

International Search Report in international application No. PCT/CN2012/071829, mailed on Sep. 27, 2012.

English Translation of the Written Opinion of the International Search Authority in international application No. PCT/CN2012/071829, mailed on Sep. 27, 2012.

\* cited by examiner

CLOUD AGENT REALIZING METHOD AND SYSTEM, AND CLOUD AGENT SERVER

TECHNICAL FIELD

The disclosure relates to the field of communication, and in particular to a cloud agent realizing method and system, and a cloud agent server.

BACKGROUND

A Call Center (CC) system is a customer service system established via telecommunication CC technology. A user dials a unified access number of the CC through a phone terminal device. An Interactive Voice Response (IVR) device of the CC provides a voice navigation service to the user. The user selects service content as needed by pressing a key according to a prompt of a voice menu. If an automatically-played voice service fails to meet a requirement of the user, the user may switch to a human service by pressing a key as provided in a voice system. After the user switches to the human service, the CC system will queue the user according to the type of the service required by the user, find an idle agent having a corresponding skill, and guide the call of the user to the agent such that the agent may serve the user.

Figure 1:
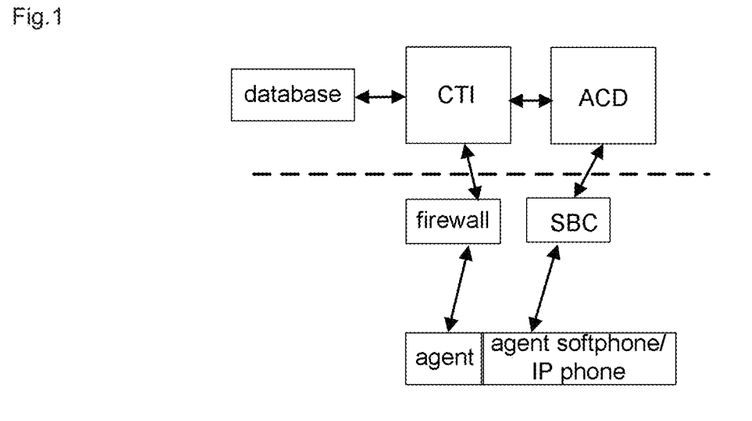
FIG. 1 is a diagram of a structure of an existing CC system.

FIG. 1 is a diagram of a structure of an existing CC system. As shown in FIG. 1, in a current Internet Protocol CC (IPCC) or a Next Generation CC (NGCC), both a platform and an agent are limited in capacity. An agent is connected to a CC data network directly, or crossing a network of agents through a firewall, so as to be connected to a CC Computer Telephony Integration (CTI device) device. A softphone or an IP phone used by an agent accesses the CC data network across the network of agents through a Session Border Controller (SBC), so as to be connected to a CC Automatic Calling Distributor (ACD) device. In the current IPCC or NGCC, an agent software configuration is local to the agent, and includes information such as an address port of a server, a recording parameter and a playing parameter.

In a Next Generation CC cloud (NGC3), the requirement of dynamic scheduling of NGC3 resources is met thanks to use of a virtual machine and a resource pool, and a CTI&ACD device (integrating CTI device and ACD functioning simultaneously) is deployed for dynamic device deployment and resource resizing.

In NGC3, in order to meet requirements of linear capacity increase and dynamic resizing, instead of using a small-size machine or a Personal Computer (PC) server with a single node, a CTI&ACD device is deployed using virtual machines each with a small capacity and using a resource pool, and the overall capacity of the NGC3 is extended with multiple devices or resources. When the capacity of the NGC3 system is insufficient, devices or resources may be added. When the capacity of the NGC3 system is more than enough, the system may release part of the devices or resources dynamically. At the same time, an NGC3 cloud CC has to meet the support of a cloud desktop by cloud computation and support agent access at multiple locations.

The following issues may exist in applying a conventional NGCC agent system and a logging method thereof to the NGC3:

1) in a conventional NGCC, an agent parameter is configured locally; while in the NGC3, it is very difficult for a system administrator to configure a parameter of the agent on site at each location due to widely-distributed cloud agents;

2) in a conventional NGCC, a single CTI device and a single ACD device fail to meet requirements on a cloud CC in the NGC3, such as linear capacity increase and dynamic resizing;

3) in the NGC3, as there are multiple CTI&ACD devices with dynamic resizing, an agent cannot determine which CTI&ACD device should be used at present;

4) due to limitation of capacity of an SBC and a firewall, as well as requirements of access network routing, each CTI&ACD device in the NGC3 may be mapped to different addresses on each SBC and firewall, and thus an agent cannot determine which mapped address should be used at present.

Therefore, a conventional way of connecting an agent and an agent phone to a single device node fails to meet a requirement of the NGC3, which requires a new way of realizing a cloud agent.

SUMMARY

In view of this, it is desired that embodiments of the disclosure provide a cloud agent realizing method and system, and a cloud agent server, capable of realizing cloud agent registration and management in an NGC3.

To this end, a technical solution of an embodiment of the disclosure is realized as follows.

A cloud agent realizing method includes steps of:

communicatively connecting an agent to a cloud agent server, and acquiring, by the agent, a parameter of the agent and a parameter of the cloud agent server from the cloud agent server; and logging, by the agent, in to the cloud agent server according to the acquired parameters.

In an embodiment, the step of acquiring, by the agent, a parameter of the agent and a parameter of the cloud agent server from the cloud agent server may be implemented by:

connecting the agent to an AgentProxy of the cloud agent server through a distributing device; and sending, by the agent, the AgentProxy an operator identifier and login information, or an agent identifier and login information, and applying for the parameter of the agent and the parameter of the cloud agent server; and acquiring, by the AgentProxy, the parameter of the agent and the parameter of the cloud agent server and forwarding the acquired parameters to the agent.

In an embodiment, the step of acquiring, by the AgentProxy, the parameter of the agent and the parameter of the cloud agent server may be implemented by:

acquiring, by the AgentProxy, the parameter of the agent by accessing a database or a configuring server, accessing a Core Distribute Module (CDM) to acquire information on a Call Control Block (CCB) to which the agent is to log in, and then acquiring the parameter of the cloud agent server from the database or the configuring server according to the acquired information on the CCB to which the agent is to log in and the login information.

In an embodiment, the information on the CCB may be one or more of a device number, an Internet Protocol (IP) address and a Media Access Control (MAC) address.

In an embodiment, the parameter of the cloud agent server may include information on a communication address of a firewall of a Computer Telephony Integration (CTI device) device and a communication address of a Session Border Controller (SBC) of an Automatic Calling Distributor (ACD) of a Call Control Block (CCB); and the step of logging, by the agent, in to the cloud agent server according to the acquired parameters may be implemented by:

logging, by the agent, in to the CTI device in the CCB through the firewall according to information on the communication address of the firewall of the CTI device, and logging in to the ACD in the CCB through the SBC according to the information on the communication address of the SBC.

In an embodiment, the CDM may be communicatively connected to a cloud scheduling module; the cloud scheduling module may apply for or release a cloud resource device in a cloud resource pool; and the method may further include a step of requesting, by the CDM, the cloud scheduling module to apply for or release a cloud resource device according to a load condition of a CCB at present.

In an embodiment, the method may further include steps of: after the step of requesting, by the CDM, the cloud scheduling module to apply for a cloud resource device, dynamically deploying, by the CDM or the cloud scheduling module, a CCB on the cloud resource device; and reporting, by a newly deployed CCB, a status and a number of online agents on the CCB to the CDM.

In an embodiment, the agent may be connected to an AgentProxy through a short connection protocol.

A cloud agent server, includes an AgentProxy, wherein the AgentProxy specifically includes:

an interface unit configured for being communicatively connected to an agent and receiving an operator identifier and login information or an agent identifier and login information sent by the agent; and an acquiring unit configured for acquiring, according to the operator identifier and login information or the agent identifier and login information sent by the agent and received by the interface unit, a parameter of the agent and a parameter of the cloud agent server, and forwarding the acquired parameters to the agent through the interface unit.

In an embodiment, the cloud agent server may further include a Core Distribute Module (CDM) communicatively connected to the acquiring unit, wherein the acquiring unit may be further configured for accessing the CDM to acquire information on a Call Control Block (CCB) to which the agent is to log in, and then acquiring the parameter of the cloud agent server according to the acquired information on the CCB to which the agent is to log in and the login information.

In an embodiment, the cloud agent server may further include a cloud scheduling module communicatively connected to the CDM, wherein the CDM may be further configured for requesting the cloud scheduling module to apply for or release a cloud resource device in a cloud resource pool according to a load condition of a CCB at present.

In an embodiment, the CDM or the cloud scheduling module may be further configured for dynamically deploying, after the cloud scheduling module applies for a cloud resource device, a CCB on the cloud resource device, and having a newly deployed CCB to report a status and a number of online agents on the CCB to the CDM.

A cloud agent realizing system, includes an agent and a cloud agent server as aforementioned.

According to a cloud agent realizing method and system as well as a cloud agent server according to embodiments of the disclosure, an agent is communicatively connected to a cloud agent server, acquires a parameter of the agent and a parameter of the cloud agent server from the cloud agent server, and logs in to the cloud agent server according to the acquired parameters. It can be learned that with embodiments of the disclosure, an agent side may access a system flexibly at multiple locations in a cloud CC, with the following beneficial effect:

1) difficulty in agent deployment and usage is reduced; the agent side does not have to configure a local parameter; and a user may acquire an agent just by accessing the system, thus meeting the requirement to access the system at any location of the cloud CC;

2) in an NGC3 cloud CC, when there are more agents to be logged in than capacity of CCBs running at present, a CDM may request a resource pool for a resource and deploy a CCB dynamically; when logged-in agents decrease far below the capacity of CCBs running at present, the CDM may release a CCB resource dynamically to the resource pool to save energy;

3) any cloud agent can acquire a correct CCB address during agent CCB dynamic resizing and disaster tolerant switching; and 4) when an agent may log in at different locations, and a CCB may be mapped to different firewall and SBC addresses, the system is able to select an address from the different addresses automatically according to a location where the agent logs in.

In short, with the embodiments of the disclosure, cloud agent registration and management are realized in an NGC3.

DETAILED DESCRIPTION

According to embodiments of the disclosure, an agent is communicatively connected to a cloud agent server, acquires a parameter of the agent and a parameter of the cloud agent server from the cloud agent server, and logs in to the cloud agent server according to the acquired parameters.

Figure 2:
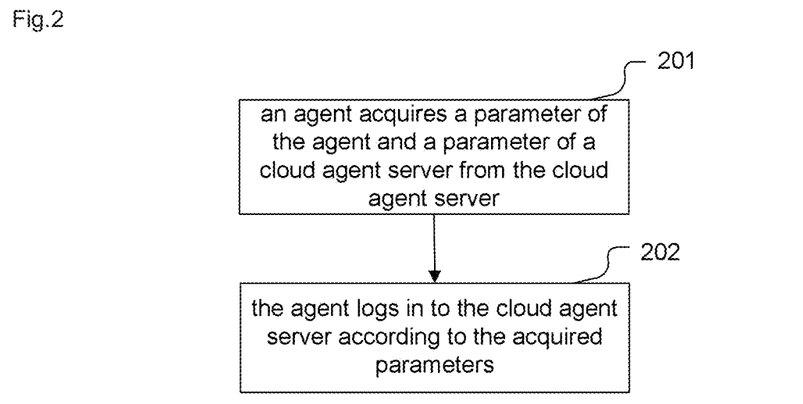
FIG. 2 is a flowchart of a cloud agent realizing method according to an embodiment of the disclosure.

FIG. 2 is a flowchart of a cloud agent realizing method according to an embodiment of the disclosure. As shown in FIG. 2, the method includes steps as follows.

In step 201, an agent acquires a parameter of the agent and a parameter of a cloud agent server from the cloud agent server;

here, the agent is communicatively connected to the cloud agent server, and the step specifically includes that: the agent is connected to an AgentProxy of the cloud agent server through a distributing device, and sends the AgentProxy an operator identifier and login information, or sends the AgentProxy an agent identifier and login information; and applies for the parameter of the agent and the parameter of the cloud agent server; and the AgentProxy acquires the parameter of the agent and the parameter of the cloud agent server and forwards the acquired parameters to the agent.

Further, the AgentProxy may acquire the parameter of the agent and the parameter of the cloud agent server by acquiring the parameter of the agent by accessing a database or a configuring server, accessing a CDM to acquire information on a CCB to which the agent is to log in, and then acquiring the parameter of the cloud agent server from the database or the configuring server according to the acquired information on the CCB to which the agent is to log in and the login information. Here, the AgentProxy accesses the database or the configuring server to acquire the parameter of the agent according to the operator identifier or the agent identifier; in addition, after acquiring the information on the CCB according to the operator identifier or the agent identifier, the AgentProxy acquires the parameter of the cloud agent server from the configuring server or the database according to the information on the CCB and the login information.

Of each CCB device, a pre-configured parameter and addresses mapped to different locations are stored on the configuring server or the database.

Note that the information on the CCB may include one or more of a device number, an IP address and an MAC address.

In step 202, the agent logs in to the cloud agent server according to the acquired parameters.

In an embodiment of the disclosure, the parameter of the agent may include one or more of an ability of an operator, an interface authorization, an employee number reporting parameter, limitation on incoming and outgoing calls, a media format, a log level, an encryption parameter, a recording uploading path, a database accessing parameter and an agent phone.

The parameter of the cloud agent server may include information on a communication address of a firewall of a CTI device of a CCB and a communication address of an SBC of an ACD of the CCB.

Accordingly, the step may specifically include that: the agent logs in to the CTI device in the CCB through the firewall according to information on the communication address of the firewall of the CTI device, and logs in to the ACD in the CCB through the SBC according to the information on the communication address of the SBC.

Here, the CDM is communicatively connected to a cloud scheduling module and the method may further include that the CDM requests the cloud scheduling module to apply for or release a cloud resource device in a cloud resource pool according to a load condition of a CCB at present.

The method may further include that: after the CDM requests the cloud scheduling module to apply for a cloud resource device, the CDM or the cloud scheduling module dynamically deploys a CCB on the cloud resource device; and a newly deployed CCB reports a status and a number of online agents on the CCB to the CDM.

Figure 3:
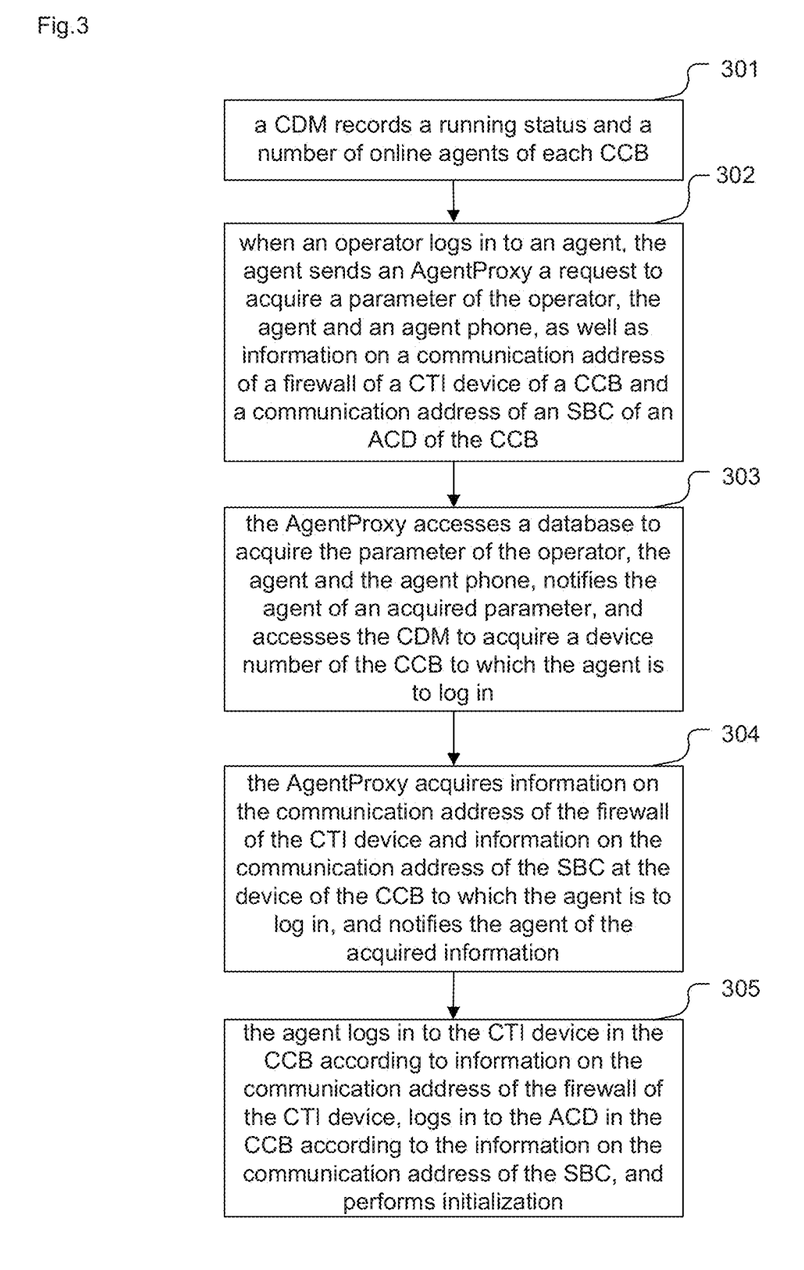
FIG. 3 is a detailed flowchart of a cloud agent realizing method according to an embodiment of the disclosure.

FIG. 3 is a detailed flowchart of a cloud agent realizing method according to an embodiment of the disclosure. As shown in FIG. 3, the method includes steps as follows.

In step 301, a CDM records a running status and a number of online agents of each CCB;

Note that the CDM may also request, according to a load condition of a CCB at present, a cloud scheduling module to apply for a release a cloud resource device;

after requesting the cloud scheduling module to apply for the cloud resource device, the CDM may deploy a CCB dynamically onto the cloud resource device; a newly deployed CCB will report a status and a number of online agents on the CCB to the CDM;

In step 302, when an operator logs in to an agent, the agent is connected to an AgentProxy through a distributing device, sends the AgentProxy information on an employee number of the operator of the agent and a current location where the operator logs in, requesting to acquire a parameter of the operator, the agent and an agent phone, as well as information on a communication address of a firewall of a CTI device of a CCB and a communication address of an SBC of an ACD of the CCB.

Here, the agent may be connected to the AgentProxy through a short connection protocol.

In step 303, the AgentProxy accesses a database to acquire the parameter of the operator, the agent and the agent phone, notifies the agent of an acquired parameter, and accesses the CDM to acquire a device number of the CCB to which the agent is to log in.

Here, the CDM dynamically allocates, according to a strategy, the device number of the CCB to which the agent is to log in this time;

In step 304, the AgentProxy acquires, according to the acquired device number of the CCB to which the agent is to log in and the current location where the operator logs in, information on the communication address of the firewall of the CTI device and information on the communication address of the SBC at the device of the CCB to which the agent is to log in, and notifies the agent of the acquired information.

Here, the AgentProxy generally acquires, by looking up a preset mapping list, the information on the communication address of the firewall of the CTI device and information on the communication address of the SBC at the device of the CCB to which the agent is to log in;

In step 305, the agent logs in to the CTI device in the CCB through the firewall according to information on the communication address of the firewall of the CTI device, logs in to the ACD in the CCB through the SBC according to the information on the communication address of the SBC, and performs initialization to complete registration and login.

Accordingly, an embodiment of the disclosure further provides a cloud agent server including an AgentProxy; the AgentProxy specifically includes an interface unit and an acquiring unit.

The interface unit is configured for being communicatively connected to an agent and receiving an operator identifier and login information or an agent identifier and login information.

The acquiring unit is configured for acquiring, according to the operator identifier and login information or the agent identifier and login information sent by the agent and received by the interface unit, a parameter of the agent and a parameter of the cloud agent server, and forwarding the acquired parameters to the agent through the interface unit.

The cloud agent server may further include a CDM communicatively connected to the acquiring unit.

The acquiring unit may be further configured for accessing the CDM to acquire information on a CCB to which the agent is to log in, and then acquiring the parameter of the cloud agent server according to the acquired information on the CCB to which the agent is to log in and the login information.

The cloud agent server may further include a cloud scheduling module communicatively connected to the CDM.

The CDM may be further configured for requesting the cloud scheduling module to apply for or release a cloud resource device in a cloud resource pool according to a load condition of a CCB at present.

The CDM or the cloud scheduling module may be further configured for dynamically deploying, after the cloud scheduling module applies for a cloud resource device, a CCB on the cloud resource device, and having a newly deployed CCB to report a status and a number of online agents on the CCB to the CDM.

Figure 4:
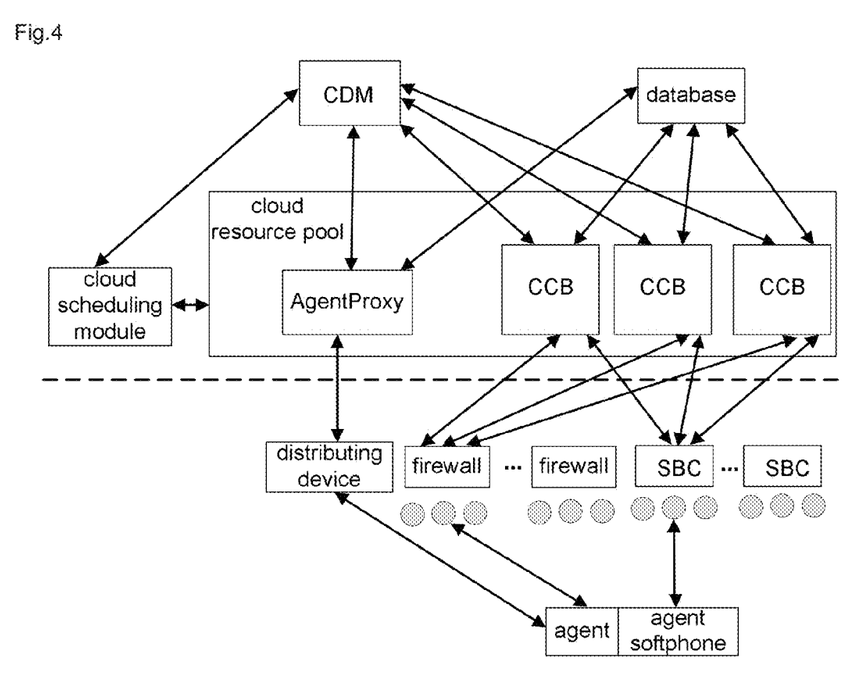
FIG. 4 is a diagram of a structure of a cloud agent realizing system according to an embodiment of the disclosure.

Accordingly, an embodiment of the disclosure further provides a cloud agent realizing system including an agent and a cloud agent server as aforementioned. A structure of the cloud agent realizing system according to an embodiment of the disclosure may be as shown in FIG. 4.

A technical solution of the disclosure will be further elaborated below with reference to a specific embodiment.

Embodiment

A system according to the present embodiment specifically includes parts as follows.

A CCB as a part of the system, is configured to realize telecommunication network signaling exchange, phone access, and voice navigation for a user; an external user phone terminal accesses the system by calling an intelligent network access number through a phone network; a voice flow is initiated first to serve the user with the guidance of the voice flow; a call status and a skill of each agent are recorded in a CC platform; when the user requires to switch to a human service, the system finds an appropriate agent according to a service requested by the user as well as information on a call status and a skill of an agent, and notifies a communication queuing machine of a phone number of the found agent; the communication queuing machine will call the agent and connect the user to the agent; after the user is connected to the agent, a customer service representative may communicate with the user through the agent phone.

A database as a part of the system, is configured to store user information, service information, system information, and agent/operator configuration information.

An agent as a part of the system, includes an agent interface module and an agent phone. The agent interface module is configured to provide a display and operation interface to a customer service representative, and control a call route of a user through a CC agent control module. The agent interface module is mainly configured to implement functions such as login, exit, call route control, content broadcast to a user, playback, recording, and number reception. The agent interface module may be further configured for providing an information query service; a customer service representative collects information on a query request of a user through conversation or number reception, inputs the query in a query interface, and informs the user of a properly selected result manually or by system voice broadcast; the agent phone is configured to enable voice communication between a customer service representative and a user.

An AgentProxy as a part of the system, provides an agent with any required parameter and address port information. Under an NGCC mode, as agents are small in number and are deployed in a centralized manner, a parameter of an agent/operator may be configured locally at an agent machine; and as there are only a single CTI device and a single ACD, an agent may be fixedly connected to the CTI device and the ACD. Under an NGC3 mode, an agent dynamically acquires a parameter of an operator through the AgentProxy; the agent dynamically acquires, through the AgentProxy and a CDM, a device number of a CCB to which the agent is to log in this time; for an NGC3 using a firewall and an SBC, the AgentProxy further maps the device number of the CCB to a firewall and an external port of an SBC corresponding to a current location where an operator logs in, where information on such a location is transferred through the agent.

A cloud scheduling module as a part of the system, is an important module in cloud resource pool and cloud storage technology, as well as an external interface of a cloud resource pool, and is configured for resource distributing and scheduling for modules manually by an administrator, or automatically by the system. The cloud scheduling module may: find an idle resource to be used by a cloud CC from the resource pool according to an application sent by the administrator through a management interface or a resource application automatically sent by the CDM, and dynamically deploy a required service module according to a requirement of the cloud CC; and when a traffic decreases, release, according to an application sent by the administrator through the management interface or an application automatically sent by the CDM requesting resource release, a cloud resource occupied by an idle service module such as an idle CCB or an idle AgentProxy back to the resource pool to save energy.

A Core Distribute Module (CDM) is a part of the system, where a CCB is dynamically registered to the CDM, and reports, to the CDM, device information such as a number of online agents and a status of each CCB at present. When an agent logs in, the AgentProxy requests the CDM to allocate a device number of a CCB to which the agent is to log in at present; the CDM finds a CCB device running normally according to the status of each CCB device, and finds an appropriate CCB according to a distribution strategy adopted; when an even distribution strategy is adopted, the CDM finds a CCB with the least online agents according to a number of online agents of a CCB device at present; when there are too many agents to be logged in, exceeding the capacity of CCBs running at present, the CDM may dynamically request the cloud scheduling module for a resource and deploy a CCB; when a number of logged-in agents decreases far below the capacity of CCBs running at present, the CDM may dynamically release a CCB resource to the resource pool so as to save energy; a short connection is adopted between the AgentProxy and an agent, thus a single AgentProxy is able to meet system requirements in most cases. When there are a very large number of agents and a single AgentProxy cannot meet system requirements, the CDM may dynamically request the cloud scheduling module for a resource and deploy another AgentProxy so as to realize AgentProxy resizing.

Firewall&SBC, as parts of the system, are border modules configured to control safe crossing when an agent side network accesses an NGC3 platform network; for the cloud CC, since cloud agents are widely distributed, agents at different locations have to access a same CCB through different firewalls and SBCs when the agents are to log in to the same CCB.

Figure 5:
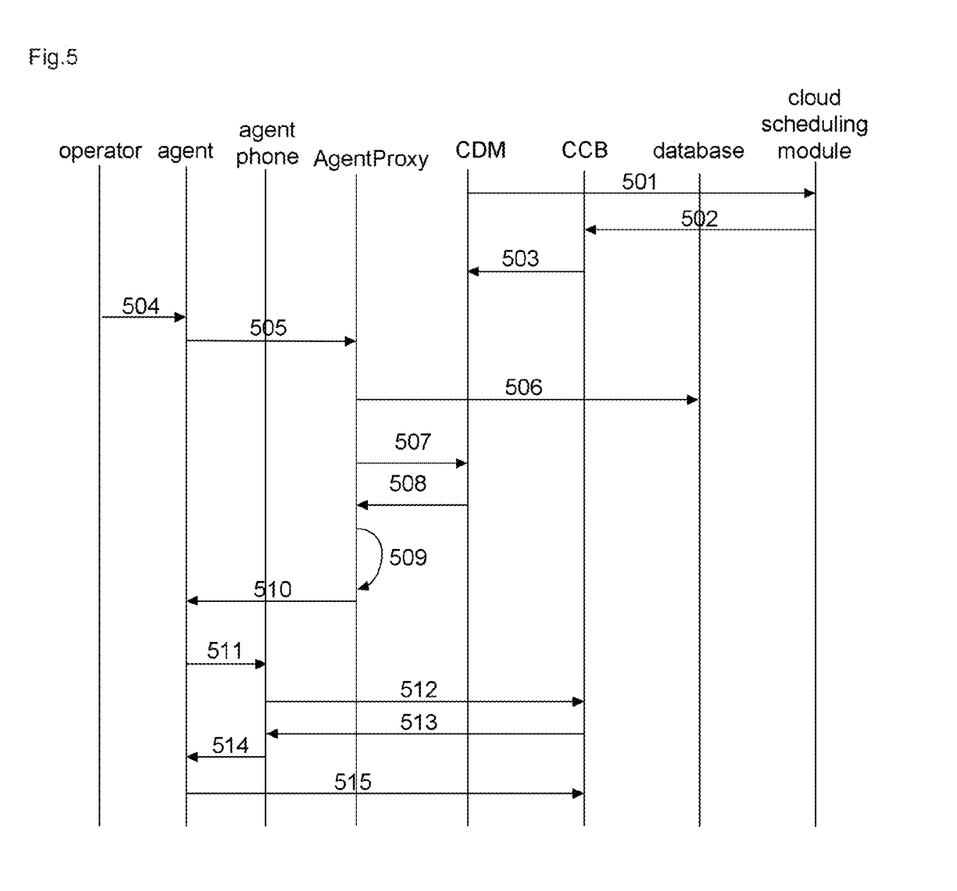
FIG. 5 is a flowchart according to an embodiment of the disclosure.

FIG. 5 is a flowchart according to an embodiment of the disclosure. As shown in FIG. 5, in a method according to an embodiment of the disclosure, a login process in which an agent logs in to an NGC3 CC includes steps as follows.

In step 501, a CDM requests a cloud scheduling module for a new CCB resource according to a busy or idle condition of a CCB at present.

In step 502, a CCB resource device is distributed and a CCB is dynamically deployed by the cloud scheduling.

In step 503, a newly-established CCB registers at the CDM and reports to the CDM a number of online agents of the CCB at present.

In step 504, an operator accesses an agent server, opens an agent interface, inputs parameters such as a renter number, an employee number and a password.

In step 505, an agent sends parameters such as the renter number, the employee number, the password, and current location information to an AgentProxy to request for a parameter of the agent.

In step 506, the AgentProxy extracts a parameter of the agent/operator from a database according to the employee number.

In step 507, the AgentProxy requests the CDM for a device number of a CCB used for the current login.

In step 508, the CDM selects, according to a status of a CCB and a number of agents logged in a CCB at present, a CCB with the least online agents, and returns, to the AgentProxy, the device number of the selected CCB with the least online agents.

In step 509, the AgentProxy acquires, according the module (i.e., device) number of the selected CCB, an address of an external port of a firewall as well as a port and an address of an SBC corresponding to a location where the operator logs in; information on such a location is transferred through the agent side.

In step 510, the AgentProxy returns, to the agent, parameters of an address, the port, the operator and an agent phone.

In step 511, the agent phone is initialized with the address of SBC and phone parameters.

In step 512, the agent phone is connected to the selected CCB through the SBC for registration.

In step 513, the selected CCB feeds back that the agent phone is registered successfully.

In step 514, the agent phone notifies the agent that the agent phone is registered successfully.

In step 515, the agent is connected to the selected CCB and logs in to the selected CCB to complete the login.

With the cloud agent realizing method according to an embodiment of the disclosure, an agent side may access a system flexibly at multiple locations in a cloud CC. The method has the following beneficial effect:

1) difficulty in agent deployment and usage is reduced; the agent side does not have to configure a local parameter; and an agent is acquired just by accessing the system, thus meeting the requirement to access the system at any location of the cloud CC;

2) in an NGC3 cloud CC, when there are more agents to be logged in than capacity of CCBs running at present, a CDM may request a resource pool for a resource and deploy a CCB dynamically; when logged-in agents decrease far below the capacity of CCBs running at present, the CDM may release a CCB resource dynamically to the resource pool to save energy;

3) any cloud agent can acquire a correct CCB address during agent CCB dynamic resizing and disaster tolerant switching; and 4) when an agent may log in at different locations, and a CCB may be mapped to different firewall and SBC addresses, the system is able to select an address from the different addresses automatically according to a location where the agent logs in.

The above are only embodiments of the disclosure and should not be used for limiting the protection scope of the disclosure.

The invention claimed is:

1. A cloud agent realizing method, comprising steps of:
recording, by a Core Distribute Module (CDM) of a cloud agent server, a status of a Call Control Block (CCB) and a number of agents currently logged in the CCB;
communicatively connecting an agent in a network of agents to the cloud agent server in an Next Generation CC cloud (NGC3) platform network, and acquiring, by the agent, a parameter of the agent and a parameter of the cloud agent server from the cloud agent server; and
logging, by the agent, in to the cloud agent server according to the acquired parameters,
wherein the step of acquiring, by the agent, a parameter of the agent and a parameter of the cloud agent server from the cloud agent server comprises steps of:
sending, by the agent, to an AgentProxy of the cloud agent server, information on an identifier of an operator of the agent and a current location where the operator logs in, or an agent identifier and the current location where the operator logs in,
acquiring, by the AgentProxy, the parameter of the agent by accessing a database or a configuring server, accessing the CDM to dynamically acquire information on a CCB to which the agent is to log in;
dynamically allocating, by the CDM according to the status of a CCB and a distribution strategy, the CCB to which the agent is to log in;
acquiring, by the AgentProxy, the parameter of the cloud agent server from the database or the configuring server according to the acquired information on the CCB to which the agent is to log in and the current location where the operator logs in, wherein for a CCB, a pre-configured parameter and addresses mapped to different locations are stored on the configuring server or the database;
forwarding, by the AgentProxy, the parameter of the agent and the parameter of the cloud agent server to the agent.

2. The method according to claim 1, wherein the step of acquiring, by the agent, a parameter of the agent and a parameter of the cloud agent server from the cloud agent server comprises steps of:
connecting the agent to the AgentProxy through a distributing device.

3. The method according to claim 2, wherein the agent is connected to the AgentProxy through a short connection protocol.

4. The method according to claim 1, wherein the information on the CCB is one or more of a device number, an Internet Protocol (IP) address and a Media Access Control (MAC) address.

5. The method according to claim 4, wherein the agent is connected to the AgentProxy through a short connection protocol.

6. The method according to claim 1, wherein
the parameter of the cloud agent server comprises information on a communication address of a firewall of a Computer Telephony Integration (CTI device) device and a communication address of a Session Border Controller (SBC) of an Automatic Calling Distributor (ACD) of a Call Control Block (CCB); and
the step of logging, by the agent, in to the aloud agent server according to the acquired parameters comprises:
logging, by the agent, in to the CTI device in the CCB through the firewall according to information on the communication address of the firewall of the CTI device, and logging in to the ACD in the CCB through the SBC according to the information on the communication address of the SBC.

7. The method according to claim 6, wherein the agent is connected to the AgentProxy through a short connection protocol.

8. The method according to claim 1, wherein the CDM is communicatively connected to a cloud scheduling module of the cloud agent server; the cloud scheduling module applies for or releases a cloud resource device in a cloud resource pool; and the method further comprises a step of requesting, by the CDM, the cloud scheduling module to apply for or release a cloud resource device according to a load condition of a CCB at present.

9. The method according to claim 8, further comprising steps of: after the step of requesting, by the CDM, the cloud scheduling module to apply for a cloud resource device, dynamically deploying, by the CDM or the cloud scheduling module, a CCB on the cloud resource device; and reporting, by a newly deployed CCB, a status and a number of agents currently logged in the newly deployed CCB to the CDM.

10. The method according to claim 9, wherein the agent is connected to the AgentProxy through a short connection protocol.

11. The method according to claim 8, wherein the agent is connected to the AgentProxy through a short connection protocol.

12. A cloud agent server in an Next Generation CC cloud (NGC3) platform network, the cloud agent server comprising an AgentProxy and a Core Distribute Module (CDM) communicatively connected to the AgentProxy, wherein
the CDM is for: recording a status of a Call Control Block (CCB) and a number of agents currently logged in the CCB; dynamically allocating, according to the status of a CCB and a distribution strategy, a CCB to which an agent in a network of agents is to log in;
the AgentProxy comprises an interface unit and an acquiring unit, wherein
the interface unit is configured for being communicatively connected to the agent; receiving, from the agent, information on an identifier of an operator of the agent and a current location where the operator logs in, or an agent identifier and the current location where the operator logs in; and
the acquiring unit is configured for acquiring a parameter of the agent by accessing a database or a configuring server; accessing the CDM to dynamically acquire information on the CCB to which the agent is to log in; acquiring a parameter of the cloud agent server from the database or the configuring server according to the acquired information on the CCB to which the agent is to log in and the current location where the operator logs in; forwarding the parameter of the agent and the parameter of the cloud agent server to the agent through the interface unit,
wherein for a CCB, a pre-configured parameter and addresses mapped to different locations are stored on the configuring server or the database.

13. The cloud agent server according to claim 12, further comprising a cloud scheduling module communicatively connected to the CDM, wherein
the CDM is further configured for requesting the cloud scheduling module to apply for or release a cloud resource device in a cloud resource pool according to a load condition of a CCB at present.

14. The cloud agent server according to claim 13, wherein
the CDM or the cloud scheduling module is further configured for dynamically deploying, after the cloud scheduling module applies for a cloud resource device, a CCB on the cloud resource device, and having a newly deployed CCB to report a status and a number of agents currently logged in the newly deployed CCB to the CDM.

15. A cloud agent realizing system, comprising the agent in the network of agents and the cloud agent server according to claim 14.

16. A cloud agent realizing system, comprising the agent in the network of agents and the cloud agent server according to claim 13.

17. A cloud agent realizing system, comprising the agent in the network of agents and the cloud agent server according to claim 12.

* * * * *